US008960230B2

(12) United States Patent
Weber

(10) Patent No.: US 8,960,230 B2
(45) Date of Patent: Feb. 24, 2015

(54) VALVE, IN PARTICULAR FOR A COMPONENT IN MICROFLUID TECHNOLOGY

(75) Inventor: Lutz Weber, Zweibrücken (DE)

(73) Assignee: Thinxxs Microtechnology AG, Zweibrücken (DE)

( * ) Notice: Subject to any disclaimer, the term of this patent is extended or adjusted under 35 U.S.C. 154(b) by 247 days.

(21) Appl. No.: 13/145,739

(22) PCT Filed: Dec. 16, 2009

(86) PCT No.: PCT/DE2009/001795
§ 371 (c)(1),
(2), (4) Date: Aug. 17, 2011

(87) PCT Pub. No.: WO2010/083795
PCT Pub. Date: Jul. 29, 2010

(65) Prior Publication Data
US 2011/0297866 A1  Dec. 8, 2011

(30) Foreign Application Priority Data

Jan. 21, 2009  (DE) .................. 10 2009 005 874

(51) Int. Cl.
*F16K 11/074*  (2006.01)
*B81B 5/00*  (2006.01)
*B81B 3/00*  (2006.01)
(Continued)

(52) U.S. Cl.
CPC ....... *F16K 99/0001* (2013.01); *B01L 3/502738* (2013.01); *B01L 3/502746* (2013.01); *F16K 99/0013* (2013.01); *F16K 99/0015* (2013.01); *B01L 3/567* (2013.01); *B01L 2300/0816* (2013.01); *B01L 2400/0487* (2013.01); *B01L 2400/0644* (2013.01)
USPC .................. 137/625.46; 137/625.11; 251/331

(58) Field of Classification Search
CPC ..... F16K 11/022; F16K 11/0655; F16K 7/17; F16K 7/12; F16K 7/14
USPC .......................... 137/625.46, 625.11; 251/331
See application file for complete search history.

(56) References Cited

U.S. PATENT DOCUMENTS 2,613,056 A * 10/1952 Hughes .................... 137/625.29
3,339,583 A *  9/1967 Fleckenstein et al. ... 137/625.29
4,029,295 A *  6/1977 Wassmer ..................... 251/297

(Continued)

FOREIGN PATENT DOCUMENTS

DE    10227593 A1   2/2003
DE    10227593 B4   2/2003
WO    2006056236    6/2006

*Primary Examiner* — John Rivell
*Assistant Examiner* — Frederick D Soski
(74) *Attorney, Agent, or Firm* — Lucas & Mercanti, LLP; Klaus P. Stoffel

(57) ABSTRACT

The invention relates to a valve, in particular for a component in microfluid technology, comprising valve bodies (1, 2) which have surfaces (6, 7) intended for contact with each other and which can be moved relative to each other by displacing the contact surfaces (6, 7), wherein channels (4, 5) for the inflow and outflow of a fluid open into one (6) of the contact surfaces (6, 7) and a depression (9) for forming a connection between the channels (4, 5) is provided in the other contact surface (7). According to the invention, a flexible separating film (10), which can be stretched into the depression (9) to form the connection, is arranged between the contact surface (6, 7).

20 Claims, 3 Drawing Sheets

(51) Int. Cl.
*F16K 99/00* (2006.01)
*B01L 3/00* (2006.01)

(56) References Cited

U.S. PATENT DOCUMENTS

| | | | | |
|---|---|---|---|---|
| 4,858,883 A * | 8/1989 | Webster | ................ | 251/61.1 |
| 5,095,931 A * | 3/1992 | Kawabe | ................ | 137/1 |
| 5,105,851 A * | 4/1992 | Fogelman | ................ | 137/625.11 |
| 5,265,645 A * | 11/1993 | Goodwin | ................ | 137/512.15 |
| 5,725,017 A | 3/1998 | Elsberry et al. | | |
| 6,453,725 B1 * | 9/2002 | Dahlgren et al. | ................ | 73/23.42 |
| 6,470,904 B1 * | 10/2002 | Tai et al. | ................ | 137/15.18 |
| 6,702,256 B2 | 3/2004 | Killeen et al. | | |
| 6,748,975 B2 | 6/2004 | Hartshorne et al. | | |
| 6,916,113 B2 * | 7/2005 | Van de Goor et al. | ................ | 366/108 |
| 6,997,213 B1 * | 2/2006 | Towler et al. | ................ | 137/625.46 |
| 7,213,547 B2 | 5/2007 | Peliks et al. | | |
| 2004/0041111 A1 * | 3/2004 | Boecking | ................ | 251/129.06 |
| 2006/0042686 A1 * | 3/2006 | Gamache et al. | ................ | 137/51 |
| 2006/0249207 A1 * | 11/2006 | Jennings | ................ | 137/510 |
| 2007/0090321 A1 * | 4/2007 | Bork | ................ | 251/335.2 |
| 2007/0251302 A1 * | 11/2007 | Iwata | ................ | 73/61.56 |
| 2009/0014078 A1 * | 1/2009 | Gamache et al. | ................ | 137/625.48 |

* cited by examiner

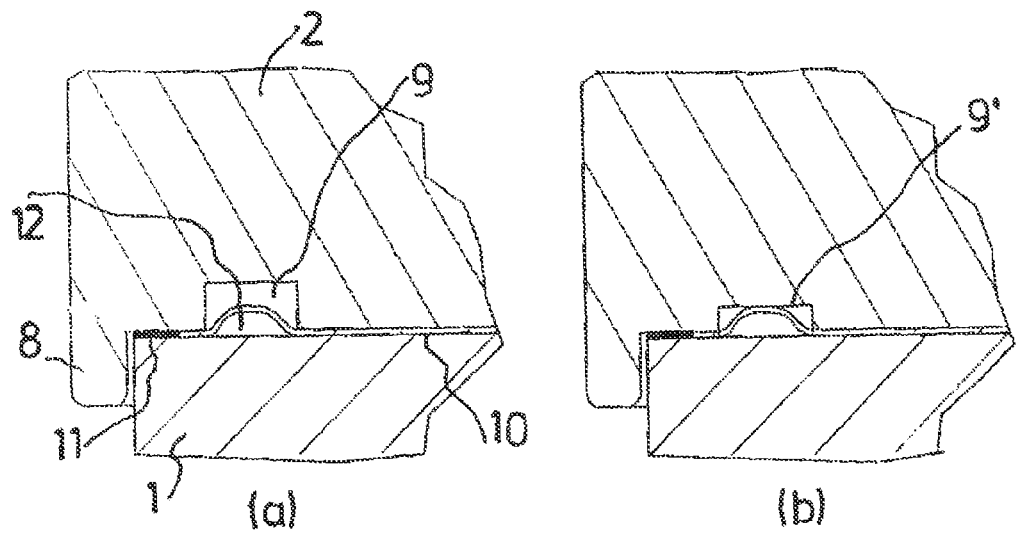
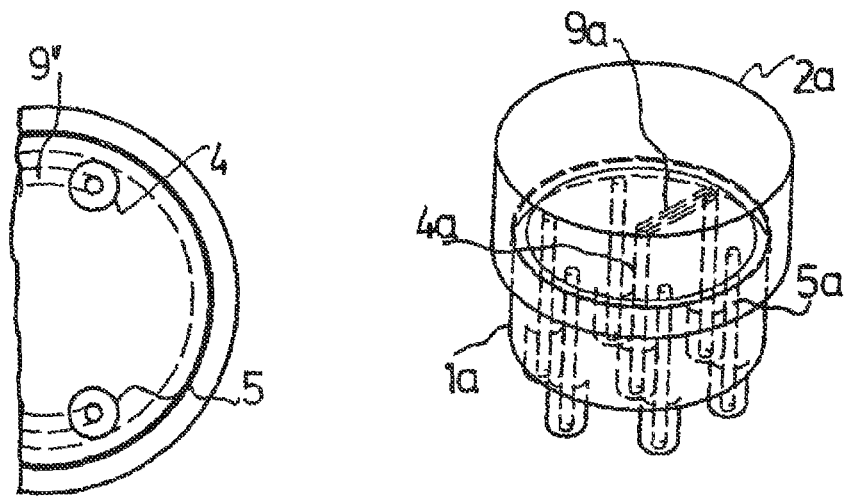
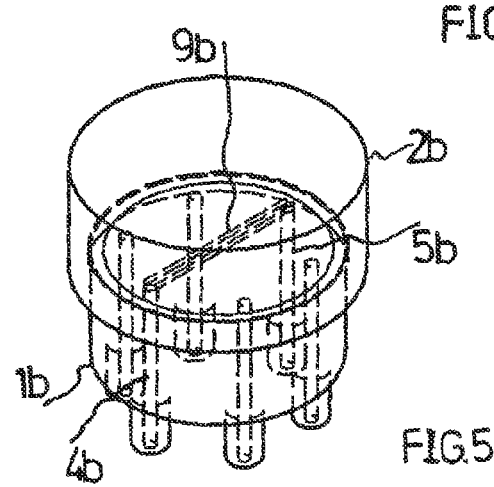

VALVE, IN PARTICULAR FOR A COMPONENT IN MICROFLUID TECHNOLOGY

The present application is a 371 of International application PCT/DE2009/001795 filed Dec. 16, 2009, which claims priority of DE 10 2009 005 874.5, filed Jan. 21, 2009, the priority of these applications is hereby claimed and these applications are incorporated herein by reference.

BACKGROUND OF THE INVENTION

The invention relates to a valve, particularly for a structural element of microfluid technology, with valve bodies having surfaces for mutual contact which are moveable relative to each other, so as to displace the contact surfaces, wherein ducts end in one of the contact surfaces for the inflow and outflow of a fluid and an indentation for the formation of a connection between the ducts is provided in the other contact surface.

Miniaturized valves of this type which can be used for flow control in microfluid technology are known from, for example, DE 102 27 593 B4 and U.S. Pat. No. 6,748,975 B2. The contact surfaces of the valve bodies of these known valves carry out a double function. On the one hand, they seal the inlet duct relative to the outlet duct when the valve is closed. On the other hand, they ensure that the valve is sealed relative to the surroundings in any position of the valve. The latter function is of particular importance, because fluid-technological microelements, in particular flow cells, are primarily used for examining substances which burden the environment, for example, substances containing pathogenic germs.

The manufacture of the contact surfaces in the quality necessary for the sealing function is very difficult. In addition, numerous requirements, among them the suitability for friction pairing, limit the possibilities of material selection. Elastic synthetic materials, which are usually suitable for sealing, which however contain softeners, usually do not qualify. In the same manner, in most cases the use of lubricants for supporting the sealing function is not permissible. For example, in the case of long-term use of the valves which impairs the sealing function of the contact surfaces there is the danger of environmental contamination.

In addition, in accordance with the prior art, a moveable valve body for securing the sealing function relative to the surroundings/environment must always rest against the wetted sealing surface and, thus, connected tightly with a structural component which processes the fluid. This is particularly disadvantageous if the structural component processing the fluid is a disposable article. Particularly in the case of several valves per disposable, the manufacture of the moveable valve body itself and for its fluid-tight mounting, for example, at a flow cell, becomes significantly more difficult.

SUMMARY OF THE INVENTION

The invention is based on the object of providing an new valve of the above-mentioned type which provides with reduced manufacturing expenses more safety with respect to environmental contamination and/or not both valve bodies must be structural components of a device which processes the fluid.

The valve meeting this object according to the invention is characterized in that between the contact surfaces is mounted a flexible separating film which is expandable into the recess while forming the connection between the ducts.

In accordance with the invention, the contact surfaces of the valve bodies facing each other no longer carry out a direct sealing function. The requirements with respect to the surface quality of the contact surfaces is reduced accordingly. Because of the separating film according to the invention, it is only necessary for one of the contact surfaces and, thus, only one of the valve bodies to come into contact with the fluid. The danger of contamination can be reduced.

A moveable valve body can be removed even after use without the contamination of the surroundings, for example, from a flow cell. This is also an advantage if the valve body must be replaced for reasons of wear or for building an alternative valve or switching configuration.

The separating film is preferably connected to the valve body having the ducts for the inflow and outflow, so that they cannot be displaced relative to the contact surface of the stator. Since frictional stress resulting from relative movements between the separating film and one of the contact surfaces can only take place on the side of the separating film, they cannot impair the tightness of the valve.

In a particularly preferred embodiment of the invention, one of the valve bodies forms an immovable stator and the separating film foil is connected to the stator. The other valve body is then moveable solely relative to the stator and preferably forms a rotor which is rotatable about an axis or a part which is capable of translatory displacement.

In this embodiment, the stator advantageously contains the ducts for the inflow and outflow of the fluid and the rotor contains the indentation.

While curved, for example, cylindrical contact surfaces are possible, the preferred embodiment has plane surfaces which are in particular perpendicular to the axis of rotation of the rotor.

The separating film is preferably connected with the inclusion of the openings of the ducts to one of the valve bodies. A partial structural group of the valve containing the separating film and one of the valve bodies can then be already by itself completely fluid tight.

The latter feature is particularly important for an embodiment in which the stator and the separating film are integral components of the structural microcomponent, particularly of a flow cell, and the rotor is preferably a component of an operating device for the structural microcomponent. The separating film advantageously ensures that no harmful fluid reaches the environment even after the structural microcomponent has been disposed of.

One of the valve bodies advantageously has a protruding guide web which can be placed against the other valve body and ensures a reproducible movement of the valve bodies relative to each other. In the case of a rotor this guide web may be a protruding annular web which engages over an edge defining the contact surface of the other valve body.

The cross section of the openings of the ducts may be smaller or greater than the cross section of the connection between the ducts. In that case the proper function of the valve can be ensured even in the event of large measuring tolerances of the valve components.

The separating film can be deflected into the indentation by the pressure of the fluid or/and by negative pressure on the side of the separating film facing away from the fluid. In the latter case one of the valve bodies includes a suction duct leading into the indentation.

The cross section of the connection between the ducts can be controllable by changing the pressure of the fluid, so that sufficient play is available for deflection of the separating film of different widths.

In an embodiment of the invention, the indentation is in the displacement direction of the contact surfaces longer than the distance between the openings of the ducts and its cross section varies, for example, continuously or in a stepwise manner. Depending on the rotational position, the average cross section of the resulting connection ducts and, thus, the flow resistance of the duct can be changed and, thus, the flow quantity can be regulated at a given fluid pressure.

In accordance with another embodiment of the invention, the valve has several pairs of ducts each forming an inflow and an outflow for a fluid. A separate indentation can be assigned to each of the pairs, or the pairs are optionally connectable through a single indentation. In particular, a single, for example, centrally located duct can be optionally connected to one of several additional ducts.

For supporting the sealing function, between the separating film and the contact surface having the indentation, a lubricant is used between the separating film and the contact surface having the indentation, wherein the contact surface and the respective contact surface may have recesses, for example, grooves for receiving the lubricant.

BRIEF DESCRIPTION OF THE DRAWING

In the following the invention will be further explained with the aid of embodiments and the enclosed drawings which refer to these embodiments. In the drawings:

FIGS. 2 and 3 show detailed illustrations of various embodiments of the valve of FIG. 1;

FIGS. 4 to 7 show additional embodiments according to the invention;

DETAILED DESCRIPTION OF THE INVENTION

Figure 1:
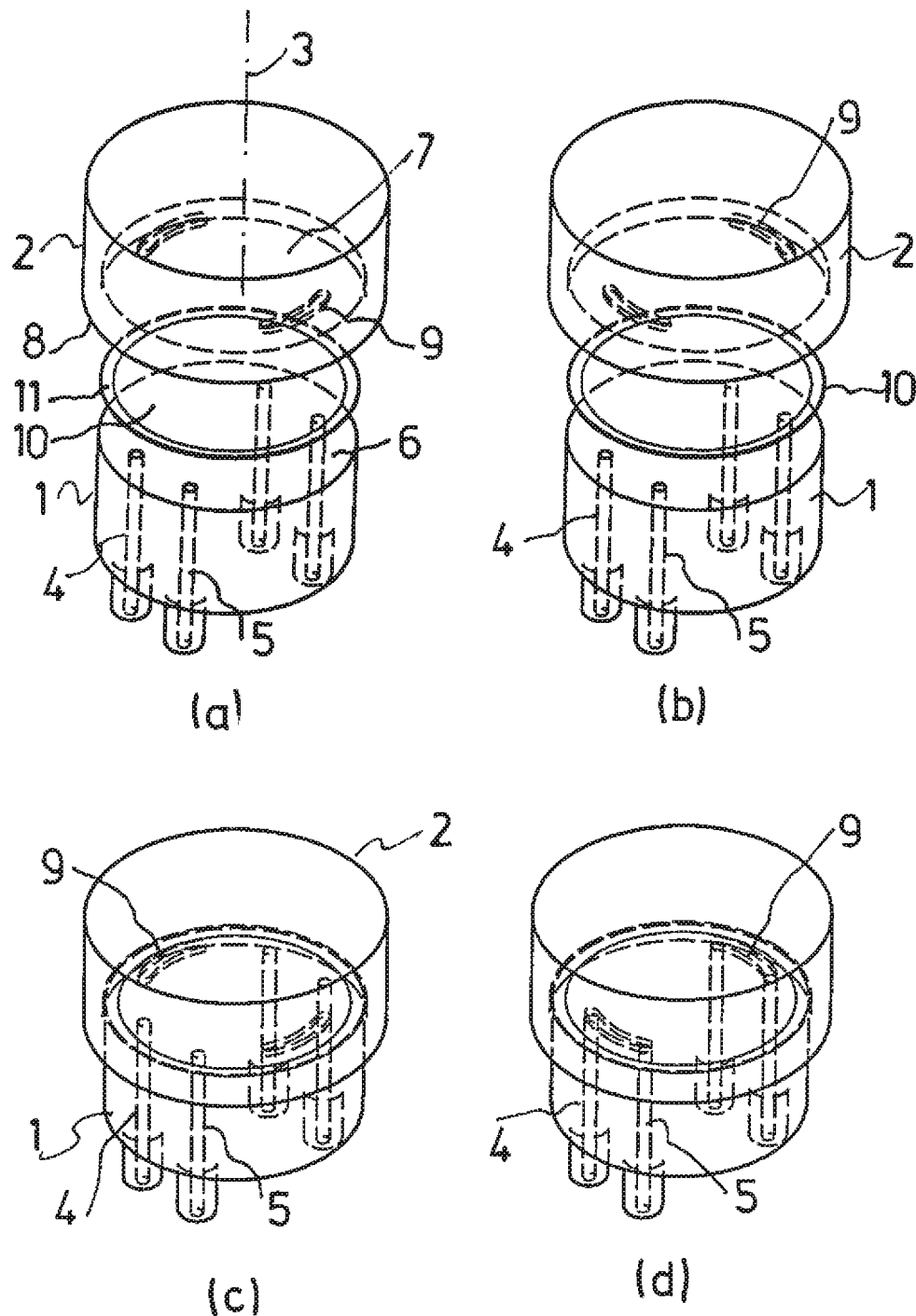
FIG. 1 shows a first embodiment of a valve according to the invention, in the open and closed positions, partially in an exploded illustration.

A miniaturized valve suitable for controlling gas and liquid flows includes a first valve body 1 forming a stator and a second valve body 2 forming a rotor. The rotor is rotateable through a motor drive device (not shown) about an axis 3.

Two pairs of ducts 4 and 5 extend through the first valve body or stator 1 which each form an inflow and an outflow for a fluid and open out in a contact surface 6 facing the second valve body for rotor 2.

Opposite the plane circular contact surface 6 of the stator is a plane congruent contact surface 7 of the rotor. The contact surface 7 is defined by an annular web 8 which engages over the contact surface 7 through an annular web 8 engaging over the edge of the contact surface 6. In the contact surface 7 two oblong indentations 9 extending along a circular arc about the axis of rotation 3 are formed.

Between the contact surfaces of the rotor and stator is arranged a separating film 10 which, in the illustrated embodiment, is congruent with the contact surfaces and is circumferentially in a border area 11 with the inclusion of the duct openings welded to the contact surface 6 to the stator 1. The separating film 10 composed of a metal, synthetic material or composite material may have depending on the size of the valve a thickness of between 0.001 mm and 1 mm.

In the rotary positions of the rotor 2 illustrated in FIGS. 1a and 1c, the outlet openings of the ducts 4 and 5 are closed by the separating film 10 and the contact surface 7 of the rotor 2 located thereabove. In the rotary position according to FIGS. 1b and 1d, on the other hand, pressurized fluid in one of the ducts 4 and 5 can expand the separating film 10 into the indentation 9 and provide a flow connection 12 between the ducts 4, 5, as this is illustrated in FIG. 2a. In this case, the rotor 2 advantageously remains apart from the fluid. Since the fluid itself provides its path, the dead spaces within the valve are avoided.

In the embodiment illustrated in FIG. 2a, the indentation 9 is dimensioned in its cross section in such a way that further space is available for the expansion of the separating film 10 into the indentation 9 and, as a result, is composed of variations of the cross section of the flow connection 12. Due to slight changes in the fluid pressure, it is thereby possible to vary the flow quantity within a wide adjusting range. Alternatively, FIG. 2b shows only a flat indentation 9' which defines the extension of the separating film already at a low fluid pressure. Additional pressure increases can, in this case, only lead to a proportional increase of the flow quantities.

In a variation of the embodiment of FIG. 1 shown in FIG. 3, the width of two oblong indentations 9" is significantly smaller than the diameter in ducts 4 and 5. Even in the case of large measurement variations of the valve components, it is ensured that in one position of the rotor, flow connections between the duct 4, 5 can be made. Alternatively, the width of the oblong indentations would have to be significantly greater than the diameter of the ducts.

Reference will now be made to additional FIGS. 4 to 9, wherein the same or equally acting parts are provided with the same reference numerals as in the preceding figures, wherein to the respective reference numeral is added the letter a, b etc.

In an embodiment illustrated in FIG. 4 for a valve with a stator 1a and a rotor 2a, a single central duct for a serving as an inflow or an outflow for a fluid.

Figure 6:
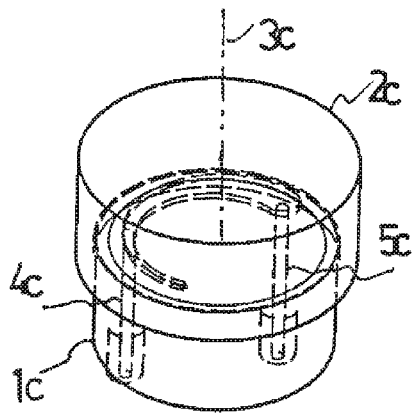

In a valve shown in FIG. 6 with a stator 1c and a rotor 2c, the stator 1c has only two ducts 4c and 5c which form an inflow and an outflow. An oblong indentation 9c extends along a circular arc around the axis of rotation 3c of the rotor 2c. The length of the circular arc of the indentation is greater than the corresponding length of the arc between the openings of the ducts 4c and 5c. Moreover, the width and/or depth of the indentation increase with the length of the arc. Depending on the rotary position of the rotor 2c, the (average) cross section of the respective connection ducts between the ducts 4c and 5c changes. In a corresponding feature (with a given contact pressure), the flow quantity depends solely on the position of the rotation of the rotor 2c. The rotor 2c can be turned in such a way that the flow quantities vary between zero and a maximum quantity.

Figure 7:
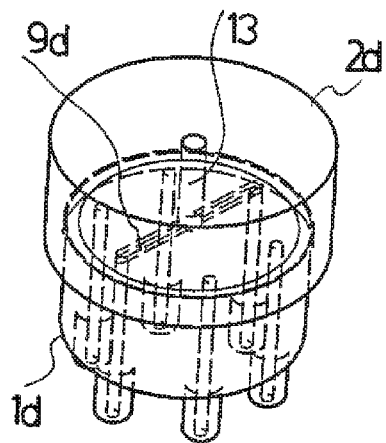

A valve shown in FIG. 7 with a stator 1d and a rotor 2d differs from the valve in FIG. 5 in that an oblong indentation 9d is in connection with a negative pressure duct 13 which extends through the rotor 2d. Accordingly the cross sectional size depends not only on the pressure of the fluid, but also on the negative pressure in the duct 13. The fluid pressure can be correspondingly low.

While the valves described above with the aid of FIGS. 4 to 7 correspond to the valve of FIG. 1, in the following deviating valves which are integrated in a flow cell will be described.

Figure 8:
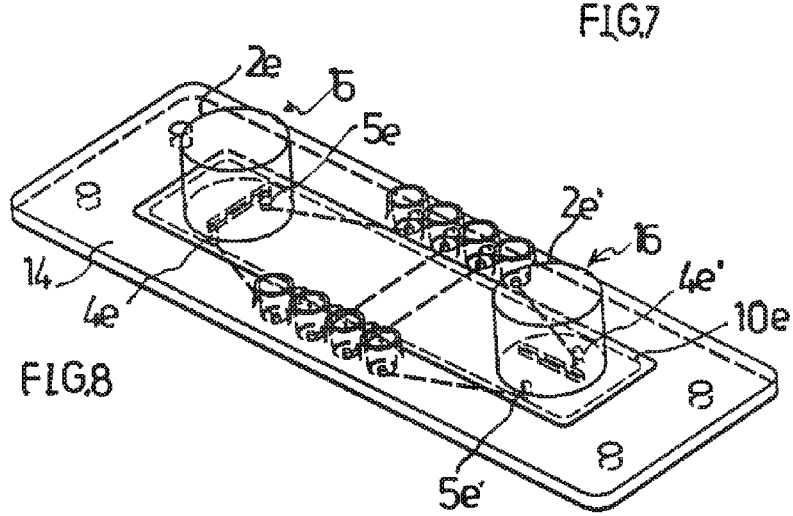
FIGS. 8 and 9 show valves according to the invention, each integrated in a flow cell.

A flow cell 14 illustrated in FIG. 8 has valves 15 and 16 with a rotor and a stator. The stator, together with a separating film be attached thereto, is an integral component of the flow cell 14, wherein always two ducts 4e and 5e or 4e' and 5e' forming an inlet and outlet extend through the stator. The rotor 2e or 2e' may be a part of an operating device for the flow cell, and when the flow cell is placed in the operating device, is placed on the area of the separating film 10e arranged above the stator. It is possible to control flows within the flow cell 14 through the valves 15 and 16; wherein the construction of the flow cell does not have to be described in further detail.

Figure 9:
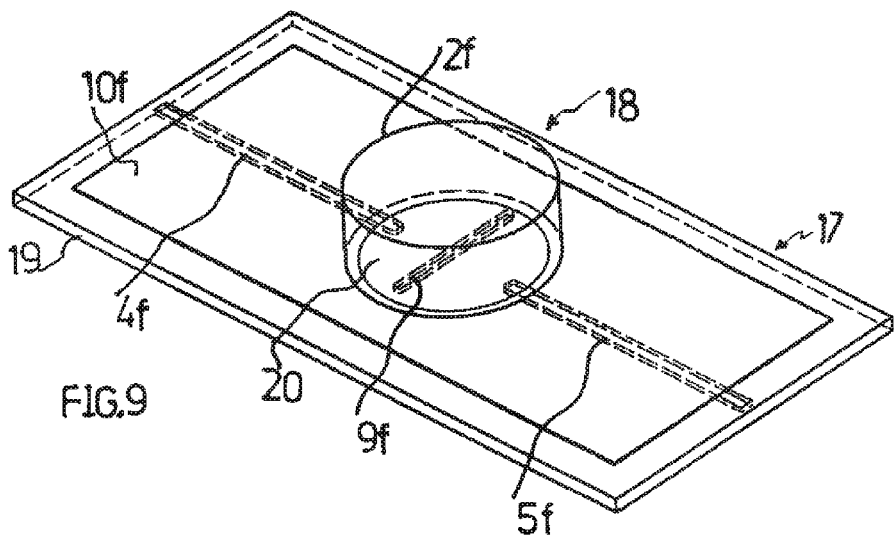

FIG. 9 further shows a valve 18 which is integrated in a flow cell 17. A film 10f arranged on a base plate 19 of the flow cell 17 is connected to the base plate 17 with the exception of a circular surface area 20. As a result of the film 10f covering grooves in the base plate 19, closed ducts 4f and 5f which are formed, seen in top view of the flow cell, which extends into the circular surface area 20. As a result, diametrically oppositely arranged openings are formed. A rotor 2f with a groove-like indentation 9f can be placed on the flow cell as a component of an operating device (not shown), and a fluid flow flowing through the ducts 4f and 5f can be controlled by the valve 18.

Substances enclosed in the flow cell remain in the flow cell even after the removal of the flow cell. The operating device does not come into contact with these substances.

The materials to be considered for the above described valves and structural microelements are, aside from metals, primarily synthetic materials, such as COC, PE, PP, PMMA, possibly in combination with aluminum. If synthetic materials are used, the inexpensive injection molding process is preferably used. The separating film can be extruded, rolled and/or laminated. The injection molding process or another casting process can also be used for the separating film. Aside from the aforementioned synthetic materials, especially silicones, polyurethane as well as thermoplastic elastomers are to be considered. For connecting the separating film to one of the valve bodies, for example, to the stator, to be considered are hot sealing, gluing, laser welding, as well as thermal or chemical bonding; in particular, the rotor can be mechanically processed and consists of very hard synthetic materials, such as POM, Teflon or other synthetic fluoride substances, metals or ceramic material. For forming the contact surfaces, low-friction layers can be applied. The principal fields of use of the above described valves or structural elements are making available, processing and analysis of fluids in the medical field, particularly medical diagnostics. Also to be considered are numerous possibilities of use in the device and automated technologies, and in the fields of cosmetics, environmental technology, food technology. In addition the use in miniaturized fuel cells and pneumatic control systems appears promising.

The invention claimed is:

1. A valve for a structural element of microfluid technology, comprising: valve bodies having matching surfaces for mutual contact while displacing the contact surfaces parallel to each other, wherein ducts for inflow and outflow of a fluid end in one of the contact surfaces and an indentation for formation of a connection between the ducts is provided in the other of the contact surfaces, which other contact surface borders the indentation all around; and a flexible separating film arranged between the contact surfaces and sealing openings of the ducts in a closed valve position, wherein the connection is formed by aligning ends of the ducts with the indentation and expanding the flexible film into the indentation, thereby forming a flow cross section, and wherein the connection is sealed by pressing the flexible film between the contact surfaces all around the indentation.

2. The valve according to claim 1, wherein the separating film is connected to the valve body having the ducts for the inflow and the outflow of the fluid.

3. The valve according to claim 1, wherein the separating film is connected to one of the valve bodies that includes openings for the ducts.

4. The valve according to claim 1, wherein one of the valve bodies has a protruding guide web which is placed against the other valve body which is constructed as an annular web.

5. The valve according to claim 1, wherein a cross section of openings of the ducts is greater or smaller than a cross section of the connection between the ducts.

6. The valve according to claim 1, wherein the separating film is expandable into the indentation as a result of pressure of the fluid and/or by negative pressure on a side of the separating film facing away from the fluid.

7. The valve according to claim 1, wherein the indentation is longer in a displacement direction of the contact surfaces than a distance between the openings of the ducts, and the indentation has a cross section that varies.

8. The valve according to claim 1, wherein a lubricant is provided between the separating film and the contact surface with the indentation, and grooves for receiving the lubricant are provided in the contact surface.

9. The valve according to claim 1, wherein a cross section of the connection between the ducts is controllable by changing pressure of the fluid.

10. The valve according to claim 9, wherein the cross section of the connection between the ducts, which is influenced by fluid pressure, is limited or is limited by cross sectional dimensions of the indentation.

11. The valve according to claim 1, wherein several pairs of ducts are provided, each forming an inflow or outflow for the fluid.

12. The valve according to claim 11, wherein the ducts of the pairs of ducts are connectable via separate indentations.

13. The valve according to claim 11, wherein the ducts of the pairs of ducts are connectable via a single indentation.

14. The valve according to claim 11, wherein a duct is connectable to one of several additional ducts.

15. The valve according to claim 1, wherein one of the valve bodies forms a stationary stator and the separating film is connected to the stator.

16. The valve according to claim 15, wherein the stator comprises the ducts for the inflow and outflow of the fluid.

17. The valve according to claim 15, wherein another of the valve bodies forms a part capable of translatory movement.

18. The valve according to claim 15, wherein another of the valve bodies forms a rotor that is rotatable about an axis.

19. The valve according to claim 18, wherein the contact surfaces are plane surfaces that extend perpendicularly to the axis of rotation of the rotor.

20. The valve according to claim 18, wherein the stator and the separating film are integral components of the structural element, and the rotor is a component of an operating device for the structural element.

* * * * *